United States Patent [19]

Ulrich

[11] 4,106,721
[45] Aug. 15, 1978

[54] SAFETY BELT RETRACTOR WITH DUAL TENSION RETRACTION MEANS

[75] Inventor: Charles J. Ulrich, Montecito, Calif.

[73] Assignee: American Safety Equipment Corporation, Encino, Calif.

[21] Appl. No.: 769,682

[22] Filed: Feb. 17, 1977

Related U.S. Application Data

[63] Continuation of Ser. No. 627,875, Oct. 31, 1975, abandoned.

[51] Int. Cl.$^2$ .................. A62B 35/02; B65H 75/48
[52] U.S. Cl. .................. 242/107; 242/107.4 R
[58] Field of Search .................. 242/107–107.7; 297/388; 280/744–747

[56] References Cited

U.S. PATENT DOCUMENTS

| | | | |
|---|---|---|---|
| 3,206,137 | 9/1965 | Snyderman | 242/107.7 X |
| 3,248,148 | 4/1966 | Board et al. | 242/107.4 R X |
| 3,550,875 | 12/1970 | Settimi | 242/107.6 X |
| 3,598,335 | 8/1971 | Seeger | 242/107.7 X |
| 3,682,412 | 8/1972 | Kuszynski | 242/107.6 X |
| 3,834,646 | 9/1974 | Heath | 242/107.7 |
| 3,851,836 | 12/1974 | Sprecher | 242/107.7 |
| 3,858,826 | 1/1975 | Sprecher | 242/107.7 |
| 3,880,364 | 4/1975 | Andres | 242/107.4 R |
| 3,957,222 | 5/1976 | Bladh | 242/107.4 R |
| 3,957,283 | 5/1976 | Pocobello | 242/107.4 R X |

*Primary Examiner*—Harvey C. Hornsby
*Assistant Examiner*—John M. Jillions
*Attorney, Agent, or Firm*—Poms, Smith, Lande & Glenny

[57] ABSTRACT

A safety belt retractor, having a webbing storage means biased toward a webbing stored condition and associated safety belt webbing, is provided with latching means for preventing movement of the storage means toward a webbing stored condition upon protraction of the webbing to relieve tension in the webbing due to the bias of the storage means and additional means for providing a limited low tension travel of the webbing while the storage means is prevented from moving by the latching means. Means are supplied for deactivating the latching means upon protraction or retraction of the webbing beyond the limits of said limited low tension travel to provide for an automatic resetting of the latching means in different positions of use of the webbing and to allow for retraction of the webbing by the webbing storage means to said stored condition when the safety belt is released.

14 Claims, 13 Drawing Figures

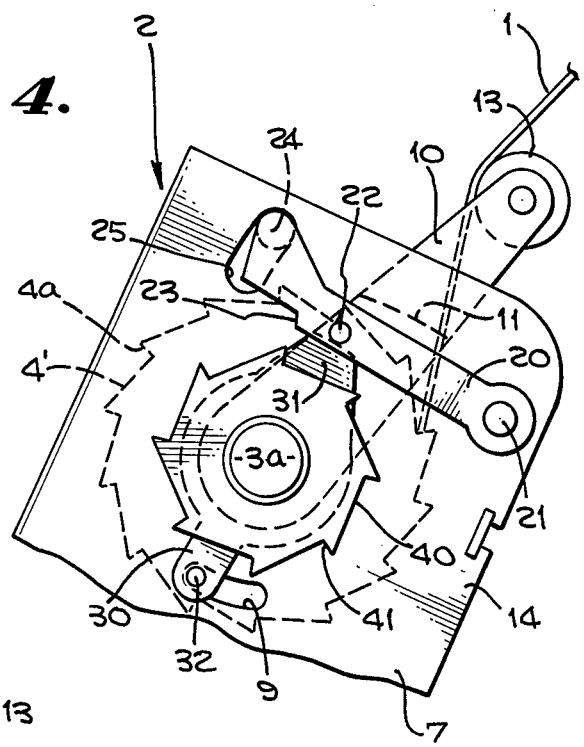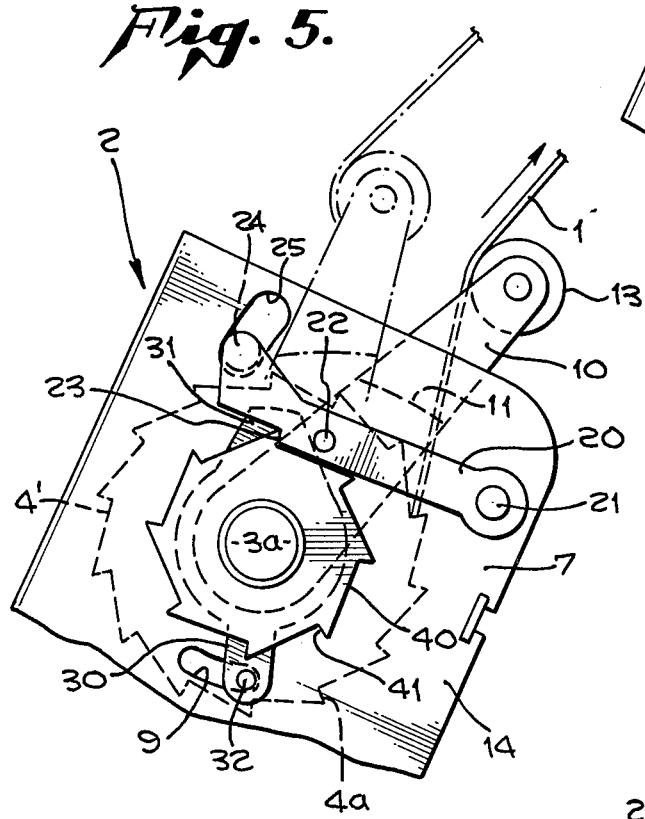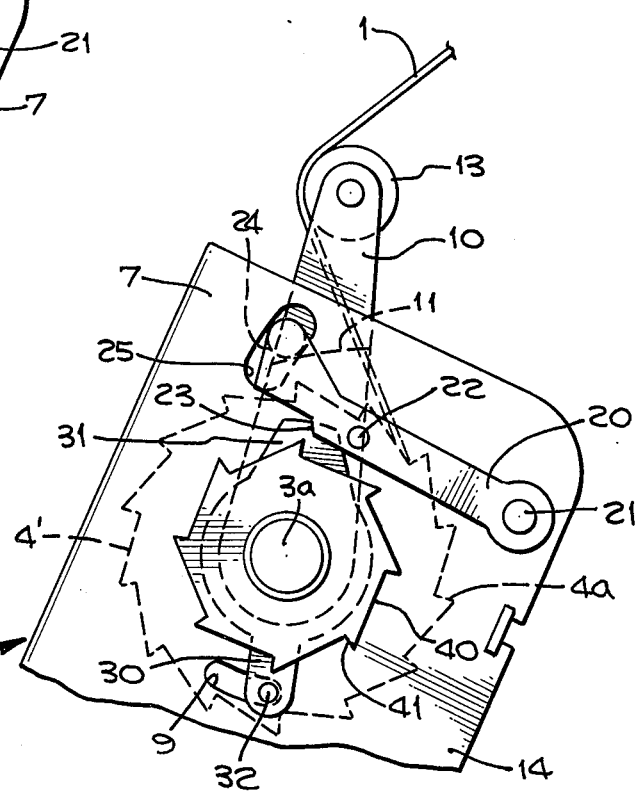

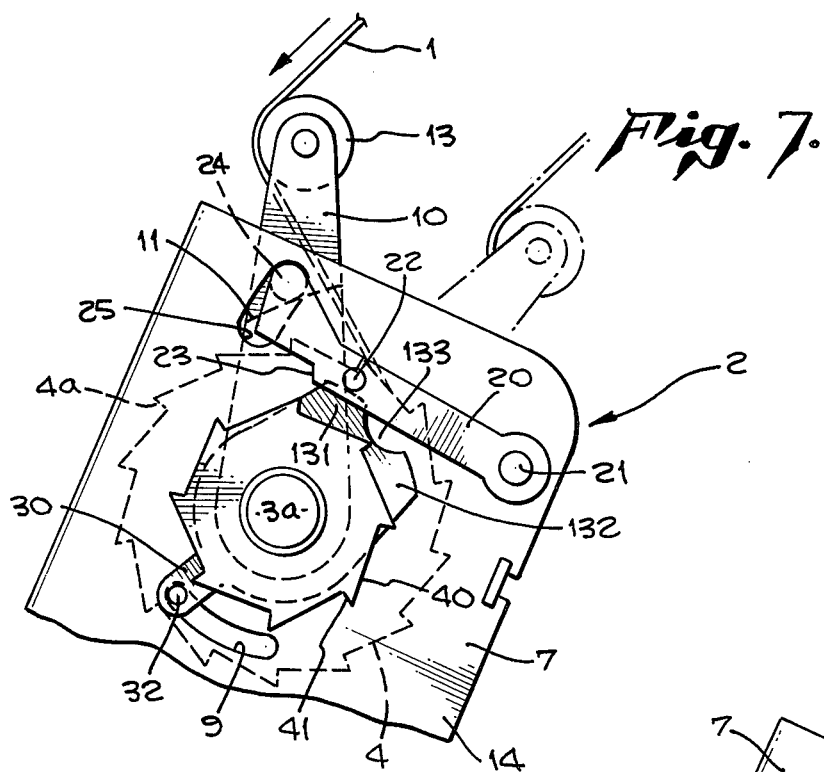
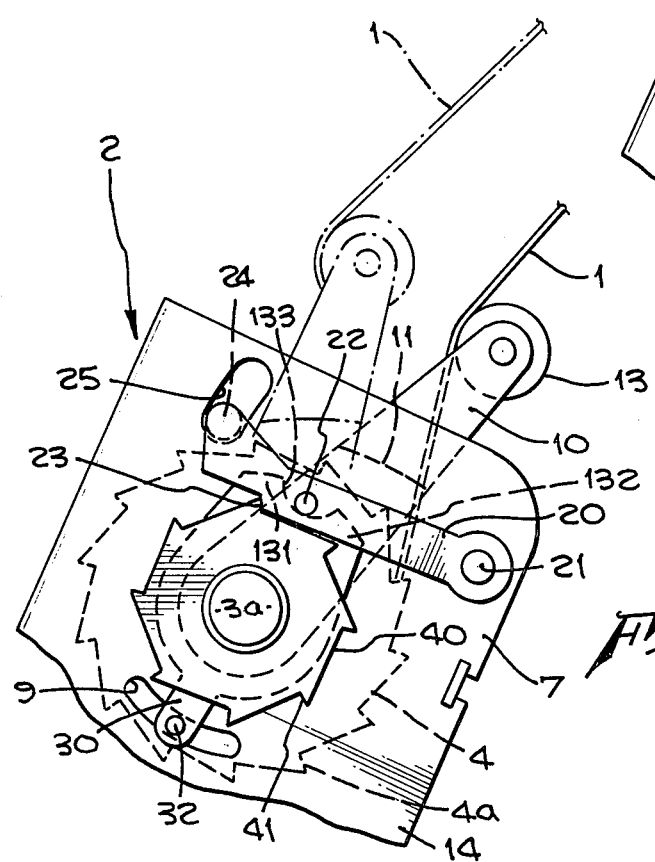

SAFETY BELT RETRACTOR WITH DUAL TENSION RETRACTION MEANS

This is a continuation, of application Ser. No. 627,875, filed Oct. 31, 1975 abandoned.

BACKGROUND OF THE INVENTION

This invention relases in general to emergency locking safety belt retractor mechanisms for use in adjustably anchoring safety belts and/or harness assemblies employed for restraining passengers in vehicle seats during emergency operations. More particularly, the present invention relates to webbing tension relieving devices, for limiting the tension applied to the safety belt webbing by the storage reel bias spring. Such tension, unless relieved, may be a source of discomfort to occupants of the vehicle during the use of the safety belt webbing system and in some automatic locking retractors may result in a cinching effect known in the art and hence may lead the occupants of the vehicle to avoid using the safety belt system.

Previous efforts to obtain a tensionless effect for safety belt webbing in vehicle associated safety belt retractors have required positive action by the occupant in order to engage the tensionless feature. An example of these previous efforts may be found in Heath, U.S. Pat. No. 3,834,646. The Heath patent requires the occupant to first protractively extend the seat belt webbing then allow retraction of the seat belt webbing followed by a further protractive movement of the seat webbing. This required manipulation of the belt may allow some users to circumvent the available tensionless feature should he be in a hurry and, therefore, should the occupant find the tension applied to the safety belt webbing by the webbing storage reel bias spring objectionable, the occupant might indeed neglect to fasten the seat belt at all.

In some automatic locking retractors in use heretofore, a loose or slack condition of the webbing is prevented during occupant movement by the retraction spring winding in such slack as it occurs, with the automatic locking retractor locking the webbing in shorter and shorter length, as the user moves about in his seat until an uncomfortable result is achieved known in the art as a "cinching" effect.

Additionally, it should be noted that other prior efforts to achieve a tensionless mode of operation, thereby avoiding the cinching effect, have potentially resulted in the creation of a loose-loop condition when the occupant extends the belt beyond the point where a snug fit of the belt would otherwise occur and then engages the tensionless mechanism. This loose-loop condition, although it might be ultimately comfortable for the occupant, creates a most dangerous condition for the occupant as it allows a zone of free travel by the occupant during an emergency condition. The potential for increased injury to the occupant is therefore greatly increased.

It has heretofore been recognized that an improved webbing tension relieving mechanism for relieving the tension applied to the safety belt webbing by the webbing storage reel bias spring is needed. It is further recognized that such tension relieving mechanism optimally would be automatically engaged by a simple protractive movement of the seat belt webbing by the occupant during buckle-up, allow for occupant movement without a cinching effect and be automatically resetting when the occupant resumes a normal position of use. In addition to the desirability of such a low tension feature a means for providing a low tension limited travel of the belt after buckle-up is highly desirable to allow for minor occupant movements.

SUMMARY OF THE INVENTION

It is therefore a primary object of the present invention to disclose and provide an improvement in safety belt retractor webbing tension relieving means, which provides a positive and assured engagement of the tension relieving feature upon a simple protractive movement of the safety belt webbing from the safety belt webbing storage reel.

It is a further object of the present invention to disclose and provide means for providing a limited low tension travel of the webbing while in a low tension condition to allow for minor movement of the occupant while the retractor is in a low tension condition.

It is still a further object of the present invention to disclose and provide means for automatically setting and deactivating the tension relieving means in response to normal manipulation of the safety belt.

Generally stated, the within invention includes the provision of latching means in a safety belt retractor, having a webbing storage means biased toward a webbing stored condition and associated safety belt webbing, for preventing movement of the storage means toward the stored condition upon a simple protraction of the webbing in order to relieve tension in the webbing due to the bias of the storage means and means for providing a limited low tension travel of the webbing while the storage means is prevented from moving by the latching means. Means are provided for deactivating the latching means to allow movement of the storage means toward the webbing stored condition upon either a protractive movement of the webbing, or retractive movement of the webbing, beyond the extremity of the limits of the limited low tension travel allowed the webbing.

More specifically, the seat belt webbing retractor is provided with a spring biased webbing storage reel rotatably mounted thereto, safety belt webbing wound on the reel and tension relieving means comprising locking pawl means and ratchet means for limiting the tension applied to the webbing by the storage reel spring by interengaging the locking pawl and ratchet. Specifically, the within invention includes the provision of webbing associated means sensitive to the degree of tautness of portions of the safety belt webbing protracted from the reel for controlling the interengagement and disengagement of the locking pawl with the ratchet such that when the webbing is tautly protracted, or slackened beyond a predetermined amount, the webbing associated means releases the locking pawl allowing either a full retraction of the webbing or an adjustment of the position of use of the webbing with the subsequent automatic resetting and activation of the tension relieving means.

The various advantages and improvements of the present invention in tension relieving means, as well as a better understanding thereof, will be obtained by those skilled in the art from a consideration of the following detailed description of exemplary embodiments of the present invention. Reference will be made to the appended sheets of drawings which will be described briefly before the detailed description of the exemplary embodiments.

BRIEF DESCRIPTION OF THE DRAWINGS

FIG. 4 is a partial side view of the safety belt retractor of FIG. 1 showing the tension relieving means disengaged and the webbing in a static condition;

FIG. 5 is a partial side view of the safety belt retractor of FIG. 1 showing the tension relieving means fully engaged and the tension arm fluctuation within the limited zone of low tension travel;

FIG. 6 is a partial side view of the safety belt retractor of FIG. 1 showing the tension relieving means fully disengaged and the tension arm in a position beyond the limits of the zone of low tension travel as would occur upon the initiation of retractive rotation of the webbing storage reel as in unbuckling and release of the safety belt webbing;

FIG. 7 is a partial side view of the safety belt retractor of FIG. 1 showing a second exemplary embodiment of tension relieving means fully disengaged, the retractor in a retractive mode of operation and a locking pawl of the tension relieving means held out of engagement with a tension relieving ratchet by a first contact surface of the friction disc;

FIG. 8 is a partial side view of the safety belt retractor of FIG. 7 showing the tension relieving means fully disengaged, the webbing storage reel in a protractive mode of operation and locking pawl held out of engagement with the tension relieving ratchet by a second contact surface on the friction disc to prevent a ratcheting noise during safety belt webbing protraction;

FIG. 9 is a partial side view of the safety belt retractor of FIG. 7 showing the tension relieving means fully engaged, the webbing storage reel in a static mode and the limited range of tension arm fluctuation with the zone of low tension travel;

DETAILED DESCRIPTION OF EXEMPLARY EMBODIMENTS

Figure 1:
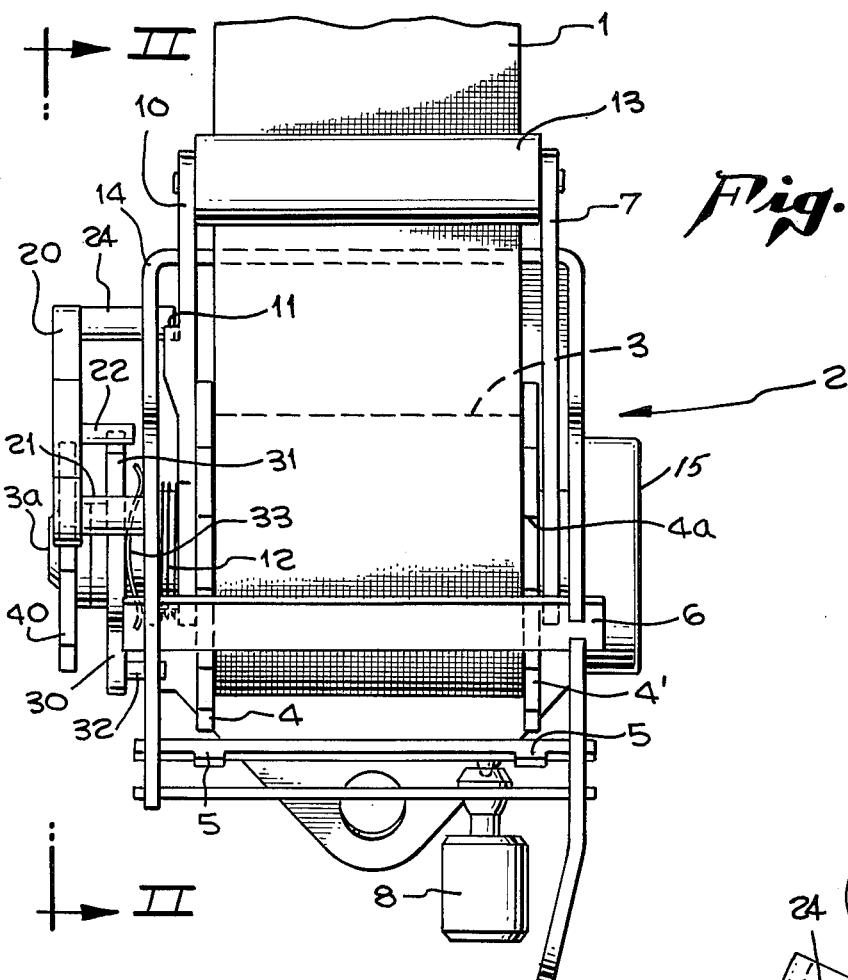
FIG. 1 is an elevational view of a safety belt retractor having a webbing storage means biased toward a webbing stored condition; and including an exemplary embodiment of tension relieving means and means for providing a limited low tension travel of the webbing when in use in accordance with the present invention.

Referring firstly to FIG. 1, a first exemplary embodiment of an emergency locking safety belt retractor mechanism in which the improvement of the present invention is included is indicated generally at 2. The illustrative retractor mechanism includes a safety belt webbing 1 wound upon a safety belt webbing storage reel 3 fixed about a reel axle 3a. A retractor frame 7 which, as is conventional, is of a generally U shape configuration, is provided with a cross brace 6 for added rigidity.

The retractor mechanism of FIG. 1 may be installed in conventional manner in a vehicle, such as an automobile, by bolting retractor frame 7 to the vehicle frame. The retractor mechanism, indicated generally at 2, is normally positioned in the vehicle adjacent a passenger seat in a position to mount the vehicle inertia sensor means 8 in operative condition and to position the safety belt webbing 1 for a protraction about the vehicle passenger. As is normal in retractor mechanisms of this type, the retractor reel 3 is biased toward a webbing stored condition by a clock type spring, within spring housing 15, provided in association with webbing storage reel 3.

A pair of ratchet wheels 4 and 4' as best seen in FIG. 1, are provided in association with the reel 3 to facilitate locking the reel against protraction of the webbing in emergency situations. As is conventional heretofore, each of the ratchet wheels 4, 4' is provided with a plurality of teeth for engagement by a locking bar 5 upon activation of the locking bar by the vehicle inertia sensitive means 8, as would occur during an emergency condition. For a more detailed description of the operation of the retractor, reference is made to U.S. Pat. No. 3,889,898 (Ziv), which is incorporated herein by reference.

Figure 2:
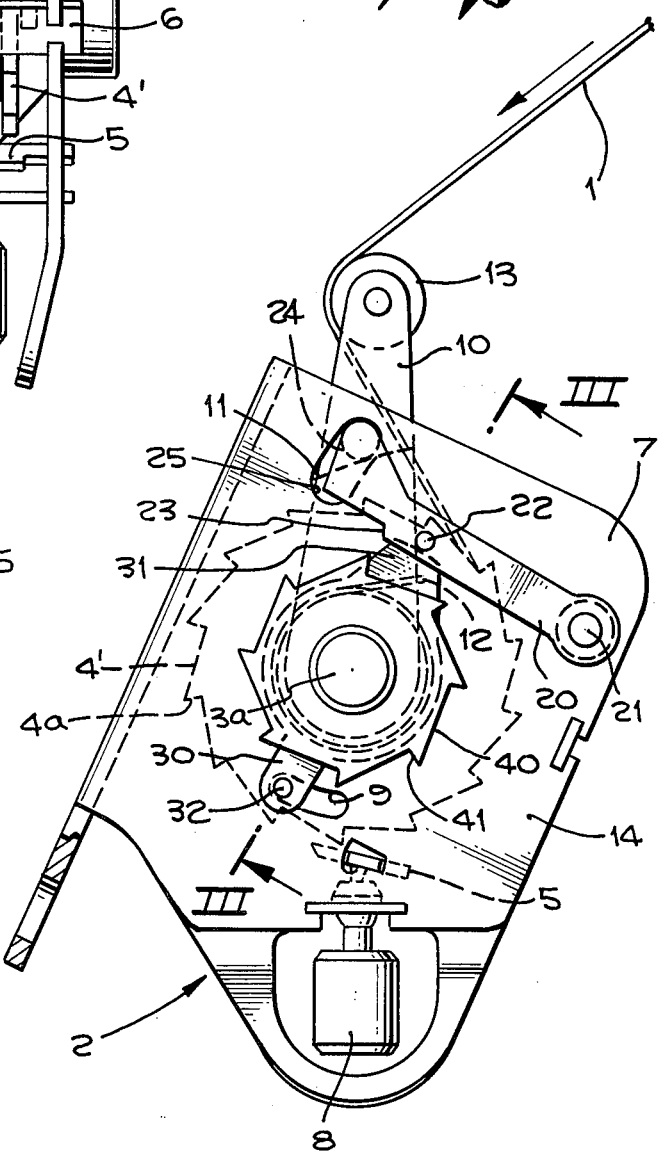
FIG. 2 is a side view of safety belt retractor of FIG. 1 taken through the plane II—II showing the relative positions of the elements of the first exemplary tension relieving means of the retractor when the safety belt webbing is fully retracted.
Figure 3:
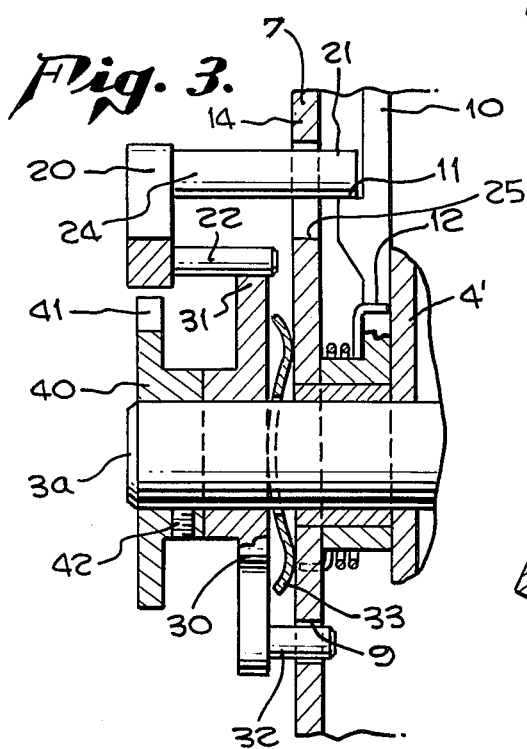
FIG. 3 is a sectional view through the plane III—III of FIG. 2 showing the tension relieving feature disengaged.

Webbing tension relieving means are provided for preventing movement of the storage reel 3 toward a webbing stored condition upon protraction of webbing 1 to relieve tension in webbing 1 due to the bias of the storage means 3. As best seen in FIG. 3, a ratchet wheel 40 is fixed upon an outer end of reel shaft 3a by a set screw 42. Ratchet wheel 40 is provided with a plurality of teeth 41, which as seen in FIG. 2, are intended to prevent clockwise rotation of ratchet wheel 40, and thus a retractive movement of reel 3, when engaged by the associated locking pawl 20. Ratchet wheel 40 and associated locking pawl 20 constitute latching means for preventing movement of the storage reel toward a webbing stored condition upon a simple protraction of the webbing to thereby relieve tension in the webbing due to the bias of the reel spring.

As seen in FIGS. 1 through 3, the latching means locking pawl 20 is pivotally mounted by pivot pin 21 to a side wall 14 of retractor frame 7. Pawl 20 is provided with a pawl face 23 adapted to engage any one of the teeth 41 of ratchet wheel 40 when allowed to fall by gravity into engagement therewith, as subsequently described. Such movement of pawl 20 is limited by the limit pin 24 which rides within slot 25 formed in the retractor side wall 14, as seen in FIGS. 2 and 3. As will be subsequently described in detail, the engagement and disengagement of pawl 20 with ratchet wheel 40 is controlled by trip means acting upon the limit pin 24 and by a frictionally driven disc acting upon the cam follower pin 22.

In view of the foregoing, it can be seen that the retractor of the exemplary embodiment will automatically lock the webbing against a protraction upon sensor 8 sensing an abnormal inertia condition for the vehicle. Absent such abnormal inertia condition, however, the webbing is free to be protracted at the will of the operator. Further, as can be seen from the foregoing description, as the operator protracts the webbing, the latching means, comprising ratchet wheel 40 and pawl 20 will automatically prevent a retraction of the webbing, providing a tension relieving feature for the webbing absent the action thereon of the within means for providing a limited low tension travel of the webbing as will not be described.

Means are provided, in accordance with the present invention, for providing a limited low tension travel of the webbing while the reel is locked by the latching means against a retractive movement for the webbing due to reel winding. As will be explained, the means for providing such a limited low tension travel of the webbing in accordance with the present invention also allows for an automatic resetting of the tension relieving means upon a protraction or retraction of the webbing beyond the limits of low tension travel provided.

The limited low tension travel means in this exemplary embodiment comprises a tension arm 10 having trip means 11 for deactivating the tension relieving means when the arm 10 is moved into the position shown in FIG. 2. As can be seen in FIG. 2, trip means 11 of arm 10 underlies or cams pin 24 of pawl 20 into an unlatched condition.

Tension arm 10 and trip means 11 are movably mounted to the retractor frame 7 for sensing the tautness of portions of webbing 1 which has been removed from storage reel 3 during protraction and retraction of the belt relative to the stored condition. As seen in FIGS. 4 through 6, tension arm 10 is pivotally mounted at an inner end to retractor frame 7 and is biased in a counter-clockwise direction by spring 12 toward webbing 1 with guide roller means 13 engaging the webbing to cause a secondary storage of webbing under tension of the tension arm bias spring. The guide means 13 are provided on an outer end of tension arm 10 to engage webbing 1 during the low tension travel thereof. Due to this engagement of webbing 1 by guide roller means 13, webbing 1 is biased in a direction lateral to the longitudinal extent of the webbing from storage reel 3, thereby providing a second storage stage of the webbing.

When the safety belt webbing is fully retracted, as is shown in FIG. 2, the reel 3 is fully wound and tension arm 10 has been biased in a counterclockwise direction to place trip means 11 into engagement with follower pin 24 on pawl 20 to hold the pawl, and thus the tension relieving latching means in unlocked condition. On protraction of the webbing, as seen in FIG. 5, the tension arm 10 is moved in a clockwise direction (due to the tautness of the webbing) causing a release of the locking pawl 20 which rides over the ratchet teeth 41 as the reel is rotated in a counterclockwise direction due to continued protraction of webbing 1. The latching means is thus provided to normally latch the tension relieving means into operative condition upon a simple protraction of the webbing. Once the pawl 20 has locked ratchet 40, and consequently reel 3, against retraction, then any subsequent slackening of webbing 1 will initially be taken up by the lateral biasing affect of the tension arm, through its associated guide means 13, against the webbing within the limit of lateral travel afforded guide means 13 by its mounting arm 10. If continued slackening of webbing 1 occurs such that tension arm 10 is allowed to move under its spring bias to the position of FIG. 2, the associated trip means 11 deactivates the pawl allowing retraction of the webbing by the reel spring. Since the reel spring is stronger than the bias spring for tension arm 10, retraction of the webbing due to a rewind action of the reel causes movement of tension arm 10 to the clockwise position of FIG. 5, essentially the same position as when the webbing is taut during a protraction of the webbing as illustrated in FIG. 5. In order to facilitate a full retraction of the webbing under the action of the reel rewind spring, a frictionally driven disc 30 is provided to maintain the tension relieving means in an inactive condition, pawl 20 out of engagement with ratchet 40, during the rewinding operation as will now be explained in detail.

Means for deactivating the latching means of the tension relieving means to allow movement of the storage reel toward a webbing stored condition upon a retractive movement of the webbing, or protractive movement of the webbing, beyond the limits of the aforedescribed limited low tension travel for the webbing are provided and, in the exemplary embodiment of FIGS. 1 through 6, comprise the friction disc 30. Friction disc 30 is rotatably mounted upon the reel shaft 3a and is biased by the spring washer 33 against an inner surface of ratchet reel 40. Therefore, on rotation of reel shaft 33a in either direction, the frictional engagement between ratchet 40 and disc 30 causes the disc to follow the direction of rotation of the reel within the limits allowed for by the disc associated limit pin 32. As seen in FIGS. 2 and 3, limit pin 32 fits through a limit slot 9 in the retractor sidewall 14 to limit arcuate rotation of disc 30.

Friction disc 30 is provided with a contact surface 31 to engage the follower pin 22 on pawl 20 for deactivating the tension relieving means to allow for a full retraction of the webbing under the urging of the reel spring when the webbing is released. As seen in FIG. 2, and as explained partially herein before, on a slackening of the webbing such that tension arm 10 moves the associated trip means 11 into engagement with the pawl limit pin 24, the pawl 20 is raised out of engagement with ratchet 40. At this point, the reel 3 is free to begin a rewind movement under the urging of its spring which causes a rotation of ratchet 40 in a clockwise direction and a consequent frictional drive of disc 30, also in a clockwise direction, to place contact surface 31 under follower pin 22 of pawl 20. Thus, as the stronger reel spring draws the webbing inwardly and causes tension arm 10 to move in a clockwise direction, thus causing the trip means 11 to become disengaged from the pawl follower pin 24, the pawl is maintained in the unlocking mode due to the presence of disc contact surface 31.

Starting now with an initiation of a protraction of webbing with the retractor and its component parts as illustrated in FIG. 2, an initial protraction will first cause tension arm 10 to be moved in a clockwise direction to the position shown of FIG. 4, prior to any rotation of the reel. Pawl 20, though disengaged from the trip means 11 of tension arm 10, is still held unlocked by the engagement between friction disc contact surface 31 and pawl follower pin 22. However, as soon as continued protraction of webbing 1, as seen in FIG. 5, causes rotation of reel 3, the counter clockwise rotation of the associated ratchet reel 40 causes a frictional driving rotation of disc 30 in a counter clockwise direction, within the limits allowed by pin 32 in slot 9, allowing a latching of pawl 20 with ratchet reel 40. On stopping of protraction of webbing 1, the tension relieving means is automatically in operation and any slack in the webbing is taken up by the lateral bias of tension arm 10, within the limits of its travel between the positions of FIG. 5 and 6. In FIG. 6, the slack in webbing 1 is sufficient to have allowed tension arm 10 to be moved under its bias sufficiently far in a counterclockwise direction so as to cause the associated trip means 11 to engage pawl limit pin 24 and thus unlock the tension relieving means. A rewinding of the reel 3 will then occur causing an initial movement of friction disc 30 to the position of FIG. 2, the disc then holding the pawl in unlocked condition during continued rewinding action during which the stronger reel spring will cause arm 10 to move in a clockwise direction as long as the webbing is taut, the mechanism assuming the position of FIG. 2 on a full rewind of the released belt.

In the alternative exemplary embodiment of FIGS. 7-9, friction disc 130 is provided with two contact surfaces 131 and 132 with a recess 133 located therebetween. Upon release and retraction of webbing 1 in this embodiment as in the former, friction disc 130 is rotated clockwise until rotation limiting member 32 reaches the left-hand extremity of aperture 9. The rotation moves surface 131 into contact with cam follower 22 and locking pawl 20 is cammed out of interengagement with ratchet 40 thus allowing unimpeded retractive rotation regardless of the position of tension arm 10, (FIG. 7).

Upon protraction of webbing 1 in the embodiment of FIGS. 7-9, friction disc 130 is rotated counter clockwise again until member 32 reaches the opposite extremity of aperture 9 and disc surface 132 cams follower 22 and locking pawl 20 out of interengagement with ratchet 40, thereby preventing a ratcheting noise during protraction of webbing 1, (FIG. 8).

Upon buckle-up a slight retractive movement of webbing 1 will occur and friction disc 130 will rotate clockwise to a neutral position where locking pawl 20 is released to engage ratchet 40 and actuate the tensionless feature.

Figure 10:
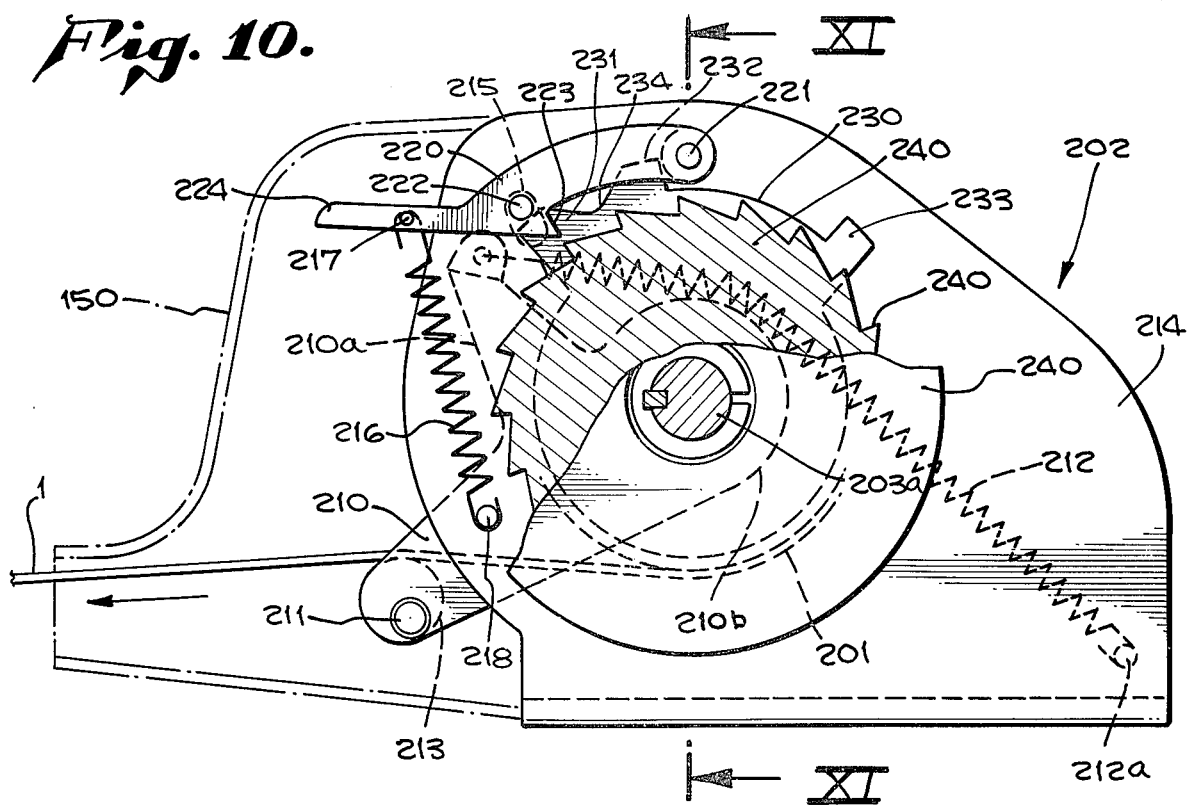
FIG. 10 is a side view of a safety belt retractor as in FIG. 1 showing a further, preferred, exemplary embodiment of tension relieving means and means for providing a limited low tension travel of the webbing when in use in accordance with the present invention, during a protraction of the webbing.
Figure 11:
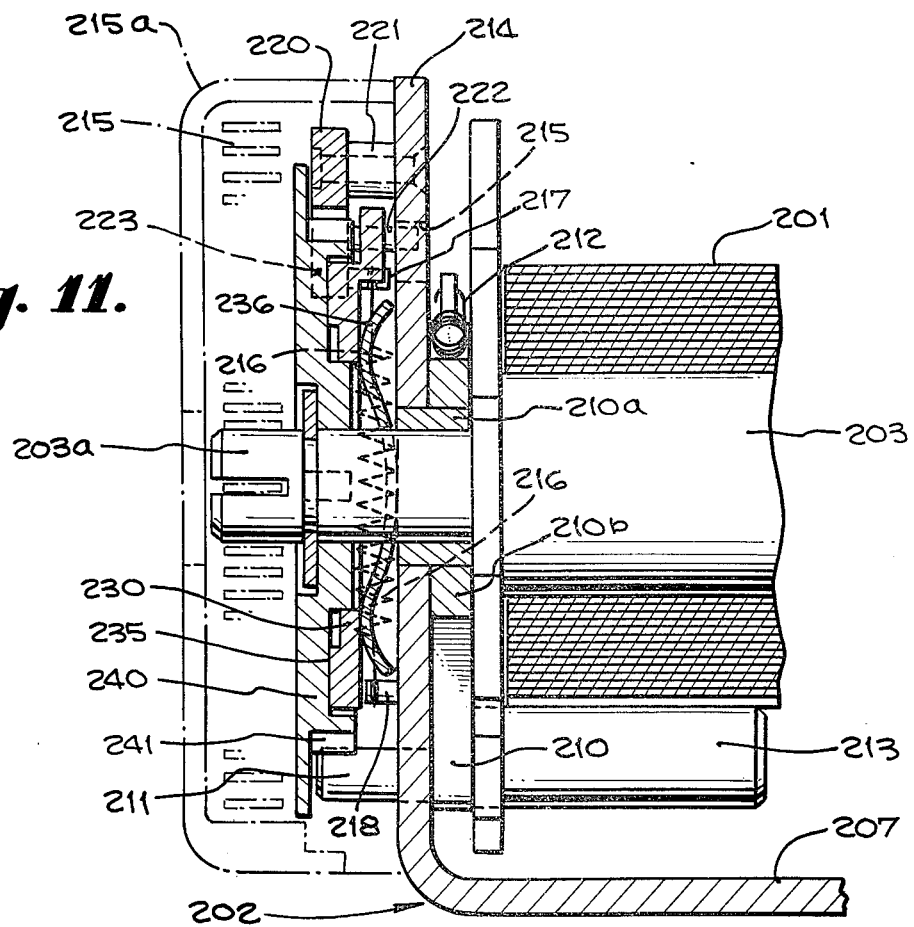
FIG. 11 is a section view of the retractor and tension relieving means of FIG. 10 taken therein along the plane XI—XI.

An additional, preferred, exemplary embodiment of the safety belt retractor webbing tension relieving means and means for providing a low tension travel of the webbing, in accordance with the present invention, is illustrated in FIGS. 10 through 13. The retractor mechanism, indicated generally at 202, and as in the case of the retractor illustrated in FIGS. 1 through 3, includes a frame 207 having side wall 214. Safety belt webbing 201 is wound upon storage reel 203 which in turn has an axle portion 203a mounted on a suitable bearing in side wall 214. Though not illustrated, a comparable axial member and bearing are provided in the opposite side wall of retractor frame 207 for mounting the retractor reel to be normally biased in a webbing wound condition under the influence of retractor spring 215. As seen in FIG. 11, retractor spring 215 is keyed to the reel shaft 203a to bias it into a fully wound condition. Rewind spring 215 may be included within a housing 215a which also encloses the tension relieving means and means for providing a low tension travel for the webbing as subsequently described, and as illustrated in FIG. 11. As in the prior embodiment, the reel also is provided with ratchet wheels, as wheel 204, for engagement with the locking pawl provided to prevent protraction during emergency conditions Means for relieving tension in the webbing upon protraction thereof in this exemplary embodiment comprise the ratchet wheel 240 having a plurality of ratchet teeth 241 adapted to be engaged by pawl 220, and particularly pawl face 223 as seen in FIG. 10. As seen in FIG. 11, pawl 220 s pivoted at its inner end on pin 221 secured to the housing side wall 214. Pivotal movement of pawl 220 is limited by the inner action of cam follower pin 222 and side wall slot 215. The outer free end 224 projects outwardly to be engaged by the trip means associated with the exemplary tension arm means of the present embodiment to be described subsequently. Pawl 220 is biased into ratchet engaging condition by coil spring 216 connected at its opposite ends to pins 217 and 218 respectively. Pawl 220 is therefore normally biased toward a position of latching of ratchet wheel 240 against a rewind of reel 203, subject to the action of the friction disc 230 and tension arm 210.

Referring to FIGS. 10 and 11, friction disc 230 is rotatably mounted about an inner hub portion of ratchet wheel 240, the latter being fixed upon shaft 23a by a key way and retainer ring arrangement illustrated. As in the aforedescribed second embodiment, disc 230 has a first contact surface 231 and second contact surface 232. In addition, a limit member 233 is provided such that arcuate rotation of friction disc 230 under the influence of ratchet wheel 40 is limited to the travel afforded by the spacing between surface 232 and limit member 233, relative to pawl pivot pin 221, as seen in FIG. 10. The frictional drive of disc 230 by ratchet wheel 240 is provided by the interface between reduced surface area 235 on disc 230 bearing against the underside of ratchet wheel 240, under the influence of Bellevue spring washer 236 as seen in FIG. 11. Friction disc 230 functions essentially as does the aforedescribed friction disc 130 in controlling operation of the latching means pawl 220 during protraction and retraction of the webbing.

The means for providing a limited low tension travel for the webbing while the tension relieving means (including the latching means of pawl 220 and ratchet 240) in the preferred exemplary embodiment comprises the provision of tension arm 210, as seen in FIGS. 10 and 11, pivotally mounted about bushing 210a. Tension arm means 210 includes a trip member 211, comprising a laterally extending pin, as seen in FIGS. 10 and 11, which is adapted to engage and trip extending portion 224 of pawl 220 when the tension arm is moved under the bias of its associated biasing spring 212. As seen in FIG. 10, spring 212 is anchored at 212a to the retractor frame at one end and to an arm portion 210b of the tension arm means 210. The moment arm of the force of spring 212 acting on tension arm 210 (the distance between the longitudinal axes of axel 203a and spring 212 decreases as the spring 212 bends about the hub 210b. Therefore, as the spring force increases due to elongation thereof, the moment arm decreases in almost direct ratio to apply a nearly constant web tension through tension arm 210.

Guide means 213 are mounted on the free end of tension arm means 210 to engage webbing 1 as seen in FIGS. 10 and 11. Guide means 213 may be pivotally mounted to the outer end of arm means 210 in order to roll during its guiding engagement with the webbing within the surrounding housing 150 as seen in a comparison of FIGS. 12 and 13.

Figure 13:
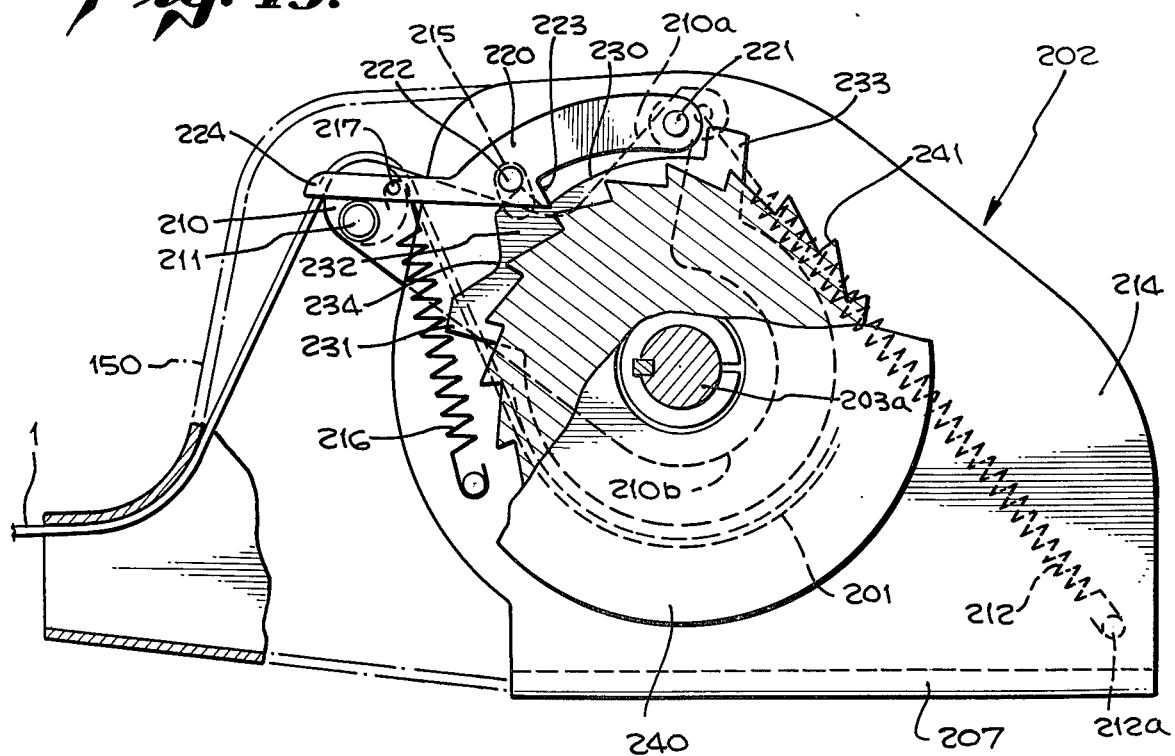
FIG. 13 is a view as in FIG. 12 showing the tension relieving means deactivated and means for providing a low tension travel of the webbing at a retractive extremity of the limits of travel.

In operation, before an initial protraction of the webbing occurs, the tension arm means 210 is biased by its associated spring 212 into a position as illustrated in FIG. 13 wherein the associated pawl 220 is held in an unlatched condition. On a protraction of the webbing, the initial movement of webbing will merely cause a tightening of the webbing and a movement of the tension arm 210 from the position of FIG. 13 to that of FIG. 10. Continued protraction will then cause a clockwise rotation of the reel 203, and consequently ratchet wheel 240. Such clockwise rotation of ratchet wheel 240 frictionally drives the disc 230 in a clockwise direction in FIG. 10 until cam surface 232 engages against limit pin 221, placing contact surface 231 beneath pin follower 222 of pawl 220. The pawl 220 is thus maintained in an unlatched condition during protraction of webbing.

When the user has protracted the webbing to a desired location of use, and he buckles the safety belt into the desired position of use, a slight retraction of the webbing will occur under the bias of the reel spring 215 causing a clockwise rotation of the reel, ratchet wheel 240 and consequently disc 230 to move the recessed area 234, between surfaces 231 and 232, beneath pin 222 and thus allowing the pawl 220 to fall, under the bias of its spring 216, into locking engagement with ratchet wheel 240, preventing further rewinding motion of the reel 203. The webbing tension relieving means is thus placed in operative condition. Since only a slight retractive movement allows movement of disc 230 to activate the tension relieving means, it is likely that a further slackening of the seat belt webbing 1 will occur during the operators use thereof. As such additional slack develops, however, the tension arm 210, under the bias of its associated spring 212, will pull the webbing laterally within housing 150, toward the position shown in dotted line in FIG. 12, to produce a low tension travel of the webbing without a release of the tension relieving means. As noted hereinbefore, in the preferred exemplary embodiment, the arrangement of spring 212 with tension means 210, illustrated, produces a constant low tension travel for the webbing in the low tension extent of travel.

Figure 12:
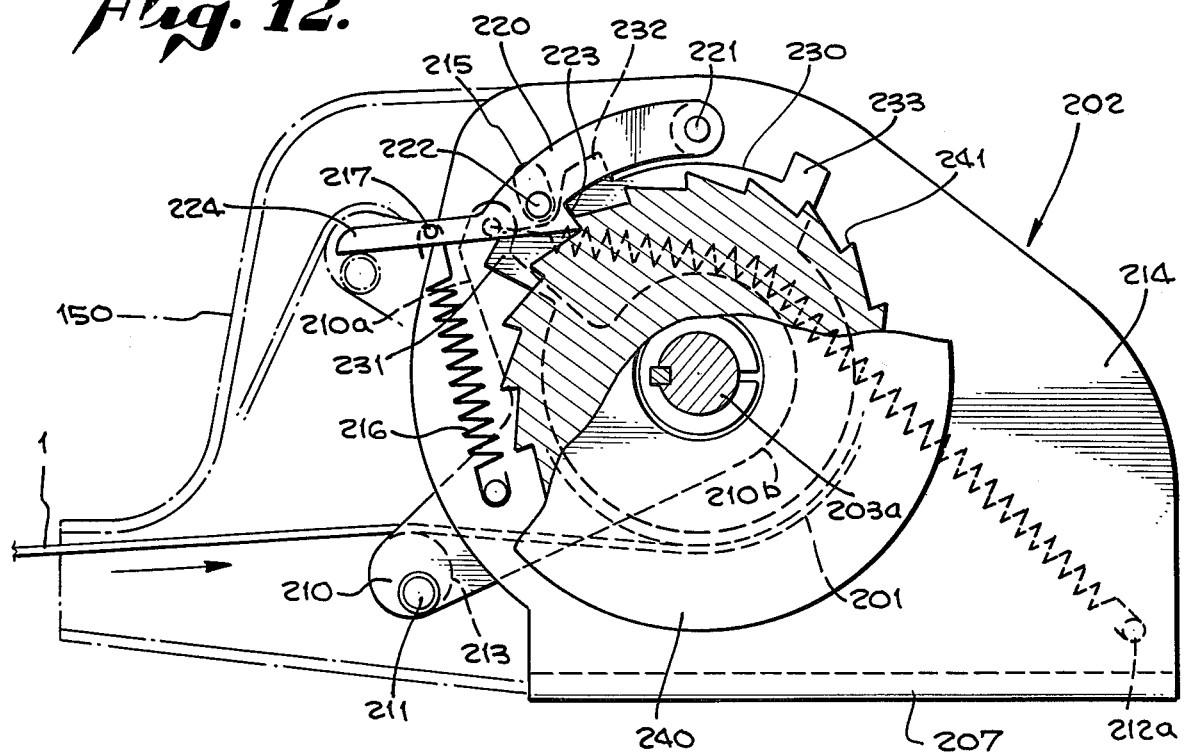
FIG. 12, is a view as in FIG. 11 showing the tension relieving means and means for providing a limited low tension travel of the webbing during an initial retraction of the webbing following protraction thereof.

While the tension relieving means and low tension travel producing means are in operative condition, as seen in FIG. 12, the webbing can be protracted or retracted beyond the limits of travel allowed for by the extent of arcuate movement of tension arm means 210 between the positions of FIGS. 12 and 13. On a protraction, the tension relieving means will be deactivated, as shown in FIG. 10, with the tension relieving means and low tension travel means being automatically reset upon placing the belt in a condition of use subsequent to such protraction as hereinbefore described. Should the user allow an over slackening of the webbing beyond the position of FIG. 12, the tension arm means 210 will move into the position of FIG. 13 to trip the pawl 220 out of latching engagement with ratchet 240. As soon as pawl 220 releases ratchet 240, a rewinding of webbing will occur and a consequent counterwise rotation of disc 230 until limit member 233 abuts stop pin 221 as seen in FIG. 13. In this position for friction disc 230, the second contact surface 232 has been moved beneath the follower pin 222 to maintain the pawl in unlocked condition as the continued rewinding of the reel tends to draw the webbing more tautly through the housing and consequently tension arm 210 away from the pawl 220.

From the foregoing, it can be seen that the present exemplary embodiments of tension relieving means and associated low tension travel producing means achieve the objects aforestated. The tension relieving means is placed in operative position upon a simple protractive movement in the first embodiment and upon such simple protractive movement followed by a slight retractive movement, normally experienced in buckling up a seat belt, in the latter two embodiments. In addition, a limited low tension travel for the webbing is provided in each of the embodiments so that the wearer does not experience uncomfortable webbing pressure, yet an over slack webbing condition is not experienced. Travel of the webbing beyond the limited low tension travel afforded causes a deactivation of the tension relieving means such that the safety belt may be placed in a different position of use, with the tension relieving means and associated low tension travel means being automatically reset, or, in the case of a full release of the safety belt from its associated buckling means, the webbing simply automatically winds back to a stored condition. It can therefore be appreciated by those skilled in the art that the tension relieving feature and low tension limited travel feature of the within invention is afforded to the user of the safety belt retractor mechanisms of the present invention without the need for any un-natural movement of the webbing, but rather is automatically operated in response to the normal simple belt movements encountered in placing the safety belt and associated webbing into use.

Having thus described a preferred, and alternative, exemplary embodiments of the present invention in safety belt retractor tension relieving means and associated low tension travel producing means, it should be appreciated by those skilled in the art that various modifications, alterations and adaptations may be made thereof within the spirit and scope of the invention which is defined by the following claims.

I claim:
1. A safety belt retractor having a frame, a webbing storage means mounted to said frame and biased toward a webbing stored condition and a safety belt webbing connected thereto and having webbing portions stored on said storage means for protraction and retraction relative to said frame comprising:
latching means for preventing movement of said storage means toward said webbing stored condition;
means for operating said latching means in response to a retraction movement of said storage means following protraction of said webbing portions to a position of use to relieve tension in said webbing portions when in use due to the bias of said storage means; and
means mounted to said frame for providing a low tension on said webbing portions and a limited low tension travel of said webbing while said storage means is prevented from moving by said latching means.

2. The safety belt retractor of claim 1 comprising:
means for deactivating said latching means to allow movement of said storage means toward said webbing stored condition, said deactivating means being operated upon a movement of said webbing beyond said limited low tension travel.

3. A safety belt retractor having, a frame, a webbing storage means mounted to said frame and biased toward a webbing stored condition and a safety belt webbing connected thereto and having webbing portions stored on said storage means for protraction and retraction relative to said frame comprising:
latching means for preventing movement of said storage means toward said webbing stored condition upon protraction of said webbing portions to a position of use to relieve tension in said webbing portions when in use due to the bias of said storage means;

means mounted to said frame for providing a low tension on said webbing portions and a limited low tension travel of said webbing while said storage means is prevented from moving by said latching means;

means for deactivating said latching means to allow movement of said storage means toward said webbing stored condition, said deactivating means being operated upon a movement of said webbing beyond said limited low tension travel wherein said means for deactivating said latching means comprises:

webbing engaging means movably mounted for engaging portions of said webbing moved from said stored condition during protraction and retraction thereof relative to said stored condition, said webbing engaging means further comprising a second biasing means for biasing the webbing engaging means against said webbing to cause said low tension travel of said webbing under tension of said second biasing means.

4. The safety belt retractor of claim 3 wherein said webbing engaging means comprises movable guide means engaging said webbing and being biased laterally of the longitudinal extent of said webbing when in use.

5. The safety belt retractor of claim 4 wherein: said latching means includes a ratchet connected to said storage means and a pawl mounted for locking engagement with said ratchet; and said deactivating means further comprises the provision of a contact surface located on said movable guide means for interengaging and disengaging said locking pawl with said ratchet of said latching means.

6. In a safety belt webbing retractor having a frame, a spring biased webbing storage reel rotatably mounted on said frame, safety belt webbing wound on said reel and tension relieving means comprising ratchet means connected to said reel and locking pawl means engageable with said ratchet means for limiting the tension applied to the webbing by the storage reel spring, the improvement in said tension relieving means comprising the provision of:

means mounted on said frame for applying a low tension on said webbing when said locking pawl means engages said ratchet means; and webbing associated means sensitive to the degree of tautness of portions of said safety belt webbing protracted from said reel for controlling the engagement and disengagement of said locking pawl means and said ratchet means such that when said webbing is protracted said webbing associated means releases said locking pawl means to allow said pawl means to engage said ratchet means and when said webbing is slackened under said low tension beyond a predetermined amount said webbing associated means causes said locking pawl means to disengage from said ratchet means deactivating said tension relieving means.

7. In the safety belt webbing retractor of claim 6 the improvement comprising the further provision of:

means driven by said storage reel for additionally controlling said engagement and disengagement of said locking pawl means and said ratchet means such that as said storage reel is protractively rotated, said driven means releases said locking pawl means thereby allowing operation of said tension relieving means and thereafter engages said locking pawl means preventing re-engagement of said pawl means with said ratchet means as said webbing storage reel is undergoing retractive rotation, whereby said tension relieving means may be automatically reactivated by a subsequent protractive movement of said webbing.

8. In a safety belt webbing retractor having a frame, a rotatable webbing storage reel mounted on said frame, means for spring biasing said reel to retract a safety belt webbing wound thereon and tension relieving means including locking pawl means and ratchet means for preventing the retractive rotation of the storage reel by the means for biasing said reel on engagement of said ratchet means by said pawl means, the improvement in said tension relieving means comprising the provision of:

tension arm means having means for engaging and sensing the degree of tautness of protracted portions of said safety belt webbing and for moving said locking pawl means between positions of engagement and disengagement with said ratchet means in response to taut and non-taut conditions therefore respectively.

9. In the safety belt webbing retractor of claim 8 the improvement in said tension relieving means further comprising the provision of:

means frictionally driven by said storage reel for sensing and responding to changes in the direction of rotation of said storage reel;

means associated with said frictionally driven means for additionally controlling said engagement and disengagement of said locking pawl means with said ratchet means in response to rotation of said reel regardless of the position of said tension arm means; and low tension means mounted to said frame for creating a condition of low tension in said webbing during operation of said tension arm means such that said webbing undergoes limited travel within pre-determined limits without disengaging said tension relieving means.

10. A safety belt retractor having a frame, a webbing storage means mounted to said frame and biased toward a webbing stored condition and a safety belt webbing connected to and wound on said storage means, comprising:

means for relieving the tension of said storage means bias upon said webbing upon protraction of said webbing to a position of use;

means mounted to said frame for applying a low tension on said webbing when said tension of said storage means bias is relieved; and means engaging with said webbing for deactivating said means for relieving the tension of said storage means upon a slackening of said webbing under said low tension beyond a predetermined amount.

11. The safety belt retractor of claim 10 wherein said means for applying a low tension on said webbing comprises a second biasing means acting on said means engaging with said webbing for applying a low tension bias on said webbing.

12. A safety belt retractor having a frame, a webbing storage means mounted on said frame and biased toward a webbing stored condition under a first tension applied by a first spring means and a safety belt webbing connected to said storage means and having webbing portions to be stored thereby, comprising:

means for relieving the webbing of said first tension applied thereto by said first spring means through said storage means; and means mounted on said frame for applying a second lower tension upon said webbing through said webbing portions when the first tension of said first spring means is relieved, wherein said means for applying said second lower tension upon said webbing comprises a second spring means and a tension arm moveably mounted to said frame which is biased by said second spring means laterally against portions of said webbing protracted from said storage means.

13. A safety belt retractor having a frame, a webbing storage means mounted on said frame and biased toward a webbing stored condition under a first tension applied by a first spring means and a safety belt webbing connected to said storage means and having webbing portions to be stored thereby, comprising:

means for relieving the webbing of said first tension applied thereto by said first spring means through said storage means; and means mounted on said frame for applying a second lower tension upon said webbing through said webbing portions when the first tension of said first spring means is relieved, wherein means are provided for reapplying the first tension of said first spring means upon said webbing through said storage means in response to a movement of said webbing beyond a predetermined amount under the influence of said means for applying a second lower tension.

14. A safety belt retractor having a webbing storage means and a safety belt webbing connected by first end portions to said storage means for protraction and retraction of opposite end portions relative thereto comprising:

means for applying a first tension on said webbing through said first end portions in a direction resisting protraction of said webbing opposite end portions to a position of use;

means for relieving said webbing of said first tension on protraction of said webbing to a position of use;

means for applying a second tension on said webbing through said first end portions in a direction resisting protraction of said webbing opposite end portions when said webbing is protracted and in said position of use, said second tension being of a lesser amount than said first tension; and means responsive to a movement of said webbing first end portions due to said second tension on said webbing of more than a predetermined amount for reapplying said first tension.

* * * * *